(12) United States Patent
Voss et al.

(10) Patent No.: US 8,991,762 B2
(45) Date of Patent: Mar. 31, 2015

(54) WING/FUSELAGE CONNECTION OF AN AIRCRAFT

(75) Inventors: Ursula Voss, Bremen (DE); Joel Rocker, Clermont le Fort (FR)

(73) Assignee: Airbus Operations GmbH, Hamburg (DE)

( * ) Notice: Subject to any disclaimer, the term of this patent is extended or adjusted under 35 U.S.C. 154(b) by 727 days.

(21) Appl. No.: 12/513,325

(22) PCT Filed: Nov. 2, 2007

(86) PCT No.: PCT/EP2007/009536
§ 371 (c)(1),
(2), (4) Date: Jul. 20, 2011

(87) PCT Pub. No.: WO2008/052801
PCT Pub. Date: May 8, 2008

(65) Prior Publication Data
US 2011/0266398 A1   Nov. 3, 2011

(30) Foreign Application Priority Data
Nov. 2, 2006   (DE) .......................... 10 2006 051 572

(51) Int. Cl.
*B64C 1/26*   (2006.01)
(52) U.S. Cl.
CPC ...................... *B64C 1/26* (2013.01)
USPC ........................ 244/131; 244/119
(58) Field of Classification Search
USPC ..... 244/45 R, 34 R, 35 R, 117 R, 129.1, 131, 244/119, 53 R, 54, 55, 53 B; 248/554; 60/796, 797
See application file for complete search history.

(56) References Cited

U.S. PATENT DOCUMENTS 4,455,004 A * 6/1984 Whitaker, Sr. ............... 244/90 R
5,277,382 A * 1/1994 Seelen et al. ..................... 244/54
(Continued)

FOREIGN PATENT DOCUMENTS

JP        4-339097        11/1992

OTHER PUBLICATIONS

Japan Office action, dated Jun. 19, 2012 along with an english translation thereof.
(Continued)

*Primary Examiner* — Joseph W Sanderson
*Assistant Examiner* — Marc Burgess
(74) *Attorney, Agent, or Firm* — Greenblum & Bernstein, P.L.C.

(57) ABSTRACT

A wing-fuselage connection of an aircraft, in which a wing (2) that is arranged in the upper region of the fuselage (1) is connected to the fuselage (1) by means of a number of couplings (3, 4, 5, 6), wherein the couplings (3, 4, 5, 6) are provided for taking up forces in various directions and are designed for a maximum load carrying capacity, in particular for a nominal flight- and landing load (10) or a nominal crash load. According to the invention, the load carrying capacity of the individual wing couplings (3, 4, 5, 6) and their direction of force take-up are matched to each other such that in the case of a defect in one of the couplings (3, 4, 5, 6) the maximum load carrying capacity of the remaining couplings (3, 4, 5, 6) is adequate for safe normal flight operation.

18 Claims, 3 Drawing Sheets

(56) References Cited

U.S. PATENT DOCUMENTS

Figure 1:
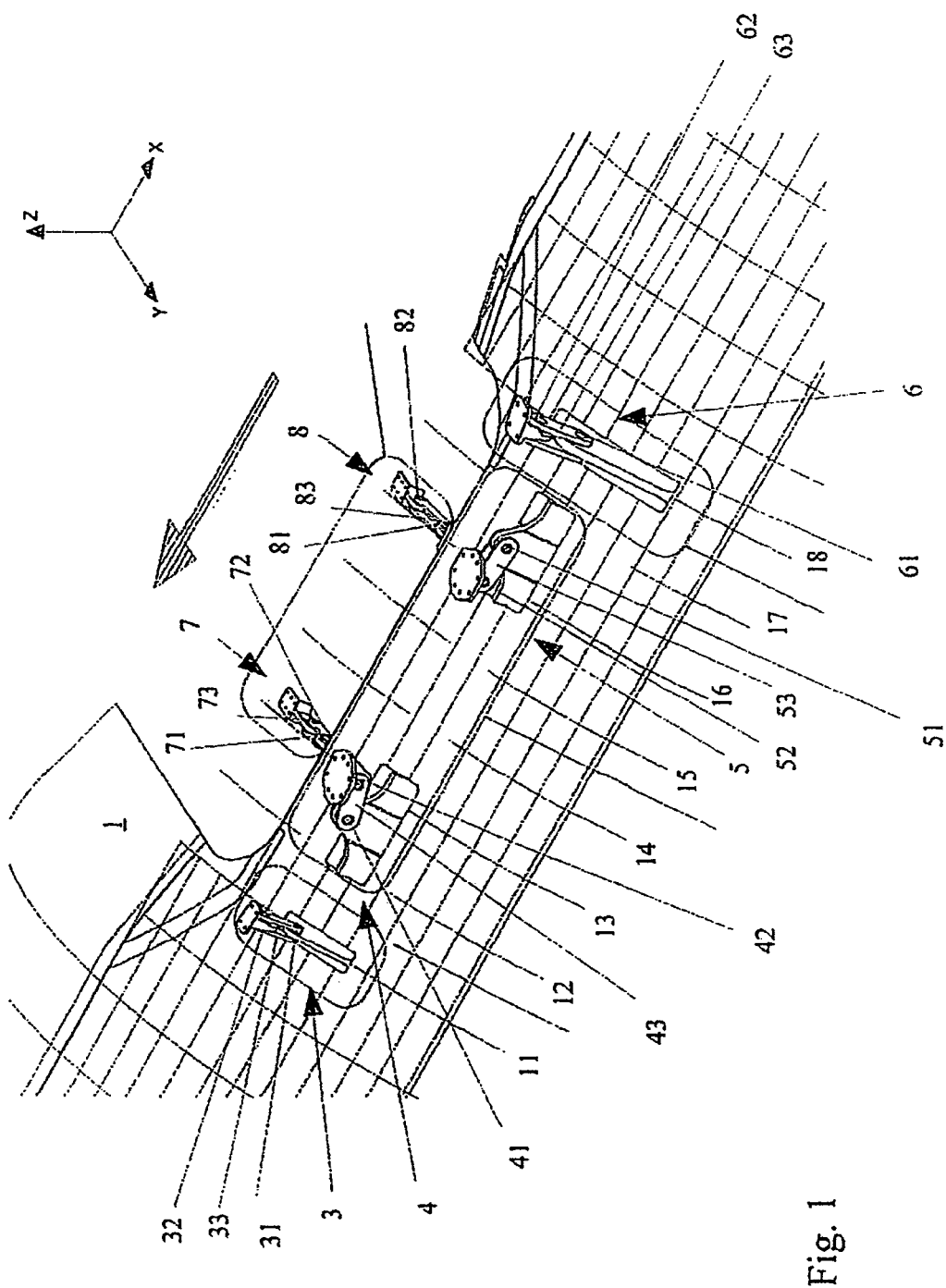

| | | | |
|---|---|---|---|
| 5,620,154 A * | 4/1997 | Hey | 244/54 |
| 5,722,621 A * | 3/1998 | Noble et al. | 244/215 |
| 6,095,456 A * | 8/2000 | Powell | 244/54 |
| 7,083,143 B2 * | 8/2006 | Whitmer et al. | 244/54 |
| 8,740,150 B2 * | 6/2014 | Werth et al. | 244/131 |

OTHER PUBLICATIONS

Niu, "Airframe Structural Design," $2^{nd}$ Ed., ISBN 962-7128-09-0, Hong Kong Conmilit. Press, Hong Kong, XP002462359, pp. 408-409, Feb. 2002.

Chinese Office Action dated Jul. 25, 2011 conducted in counterpart Chinese Application No. 200780040728.5.

* cited by examiner

WING/FUSELAGE CONNECTION OF AN AIRCRAFT

The invention relates to a wing-fuselage connection or a device for connecting the wing to the fuselage of an aircraft, according to the precharacterising part of claim 1.

In aircraft comprising a wing that is arranged in the upper region of the fuselage, typically in a high-wing aircraft, the wing is usually connected to the fuselage by means of a number of wing couplings, wherein the couplings are provided for taking up forces in various directions. The wing couplings are designed for a maximum load carrying capacity. This relates to flight loads and landing loads, as well as to crash loads with predetermined acceleration values. One possible design principle of the wing couplings is in the form of so-called rocker pendulum supports that are coupled both on the fuselage side and on the wing side by means of pivoting bearings.

In the well-known transport aircraft TRANSALL, on each side of the fuselage the wing is coupled by means of seven such rocker pendulum supports that are used for taking up forces in the direction of the vertical axis Z of the aircraft, and in the longitudinal axis X of the aircraft. These wing couplings are essentially arranged in a row in the X direction, one behind the other, wherein on the fuselage side they are attached to a longitudinal member, while on the wing side they are attached to a reinforced rib. For the time being, the coupling in the V-direction, i.e. in the direction of the wing span, is not considered.

It is the object of the invention to create a wing-fuselage connection by means of which with a small number of wing couplings and light weight the best-possible load carrying capacity and fail-safety of the wing-fuselage connection is achieved.

This object is met by a wing-fuselage connection with the characteristics of claim 1. Advantageous embodiments and improvements of the wing-fuselage connection according to the invention are stated in the subordinate claims.

The invention creates a wing-fuselage connection of an aircraft, in which connection a wing that is arranged in the upper region of the fuselage is connected to the fuselage by means of a number of couplings, wherein the couplings are provided for taking up forces in various directions and in each case comprise a maximum load carrying capacity that is in particular designed for a nominal flight- and landing load or for a nominal crash load. The invention provides for the load carrying capacity of the individual wing couplings and their direction of force take-up to be matched to each other such that in the case of a defect in one of the couplings the maximum load carrying capacity of the remaining couplings is adequate for safe normal flight operation.

According to one embodiment of the invention, the wing on each side of the fuselage is connected to the fuselage by means of four wing couplings that are provided for taking up forces essentially (i.e. with a deviation of ±30 degrees and in particular of ±15 degrees) in the direction of the vertical axis Z of the aircraft, and in longitudinal direction X of the aircraft, and that in the case of a defect in one of the couplings the maximum load carrying capacity of the remaining couplings is adequate for safe normal flight operation.

According to an exemplary embodiment of the invention, the wing couplings comprise first wing couplings that are provided for taking up forces essentially in the direction of the vertical axis Z of the aircraft, and second wing couplings which in the case of a complete number of intact wing couplings are provided for taking up forces essentially in the longitudinal direction X of the aircraft.

Preferably, in this arrangement the load carrying capacity of the second wing couplings and their direction of force take-up in relation to its angular position can be provided such that in the case of a failure of one of the first wing couplings said second wing couplings together with the at least one first wing coupling that remains intact take up the loads occurring in the wing-fuselage connection, without the maximum load carrying capacity of the wing couplings being exceeded in normal flight operation.

Furthermore, the load carrying capacity of the first wing couplings and their direction of force take-up can preferably be provided such that in the case of a failure of one of the second wing couplings said first wing couplings together with the second wing couplings that remain intact take up the loads occurring in the wing-fuselage connection, without the maximum load carrying capacity of the wing couplings being exceeded in normal flight operation.

According to one embodiment of the wing-fuselage connection, on each side of the fuselage two of the first wing couplings and two of the second wing couplings are provided.

According to one embodiment of the invention, the two first wing couplings are arranged near the front wing spar or the rear wing spar, and the two second wing couplings are provided in between.

According to one embodiment, the first wing couplings extend essentially parallel to the Z-direction between the fuselage and the wing, while the second wing couplings extend essentially in a direction situated in the X-Z-plane, at an inclination to the Z-direction, between the fuselage and the wing, wherein the angles of inclination of the second wing couplings are dimensioned and matched to each other so that the second wing couplings in the case of a defect of one of the first wing couplings take over their loads without their maximum load carrying capacity being exceeded.

According to one embodiment, the directions of the second wing couplings extend at an inclination to each other so that the lines of application of their loads intersect above the same in the region of the wing, or that the second wing couplings extend at an inclination to each other and above the same in the region of the wing are taken together on a shared fitting.

According to one embodiment of the invention, the wing couplings comprise rocker pendulum supports (pendulum supports) which in each case are formed by a fuselage-side bearing, a wing-side bearing, and a pendulum arranged in between.

The first wing couplings can be formed by rocker pendulum supports that essentially are articulated in the Y-Z-plane, while the second wing couplings can be formed by rocker pendulum supports that essentially are articulated in the X-Z-plane.

According to one embodiment of the invention, the wing couplings that are provided for taking up forces essentially in the direction of the vertical axis Z of the aircraft and in longitudinal direction X of the aircraft are arranged on each side of the fuselage essentially in a row in longitudinal direction X of the aircraft.

In addition, in order to take up forces essentially in the direction Y of the wingspan, further wing couplings are provided between the fuselage and the wing.

The further wing couplings can comprise rocker pendulum supports which in each case are formed by a fuselage-side bearing, a wing-side bearing, and a pendulum arranged in between.

According to one embodiment, the rocker pendulum supports of the further wing couplings are essentially articulated in the Y-Z-plane.

According to one embodiment of the invention, the wing-fuselage connection is provided in a high-wing aircraft with a sweptback wing.

According to the invention, an aircraft with one of the embodiments of the wing-fuselage connection described in this document is also provided.

Furthermore, according to the invention, a combination of a wing or a wing box, a fuselage part and a wing-fuselage connection is also provided.

Figure 2:
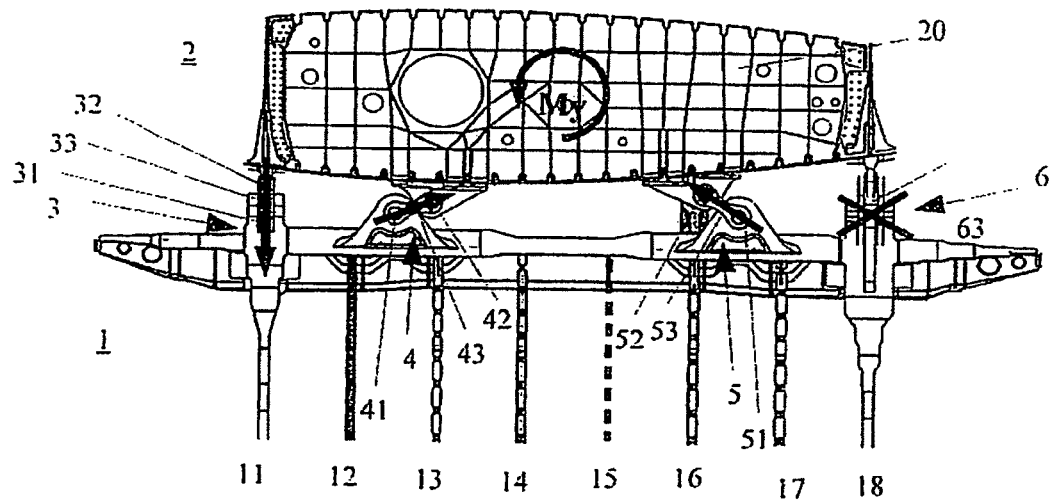
Figure 3:
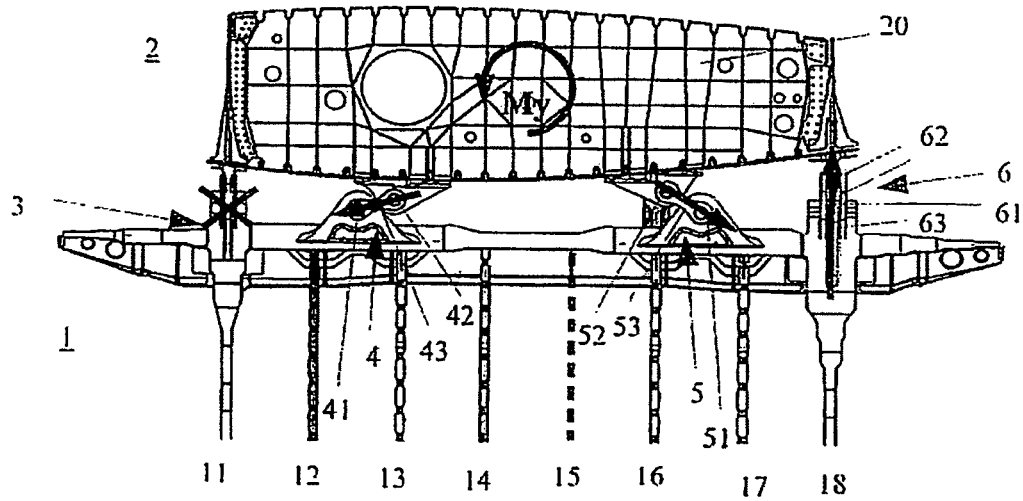
Figure 4:
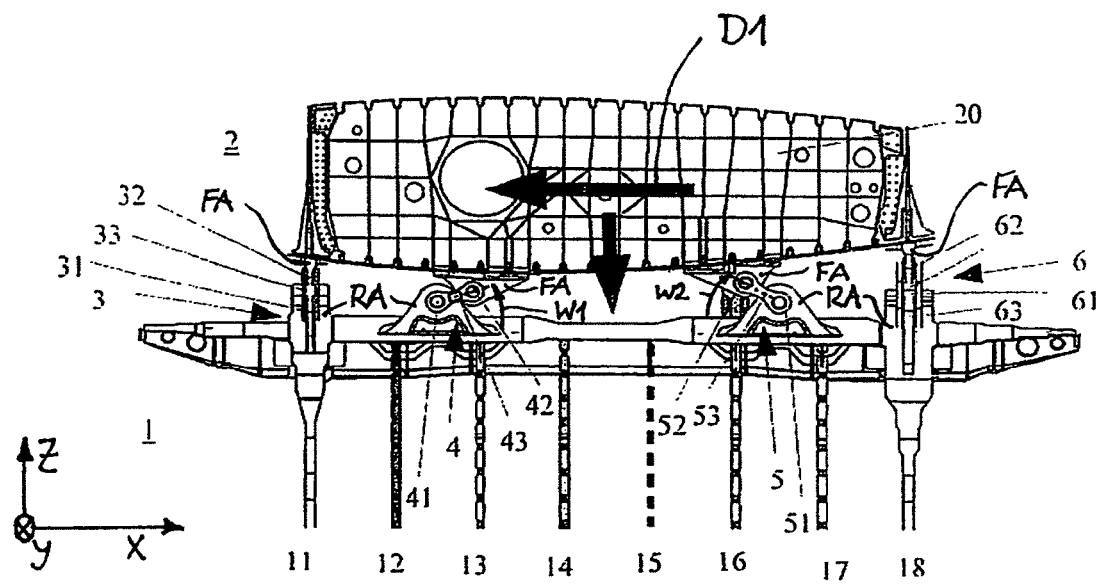
Figure 5:
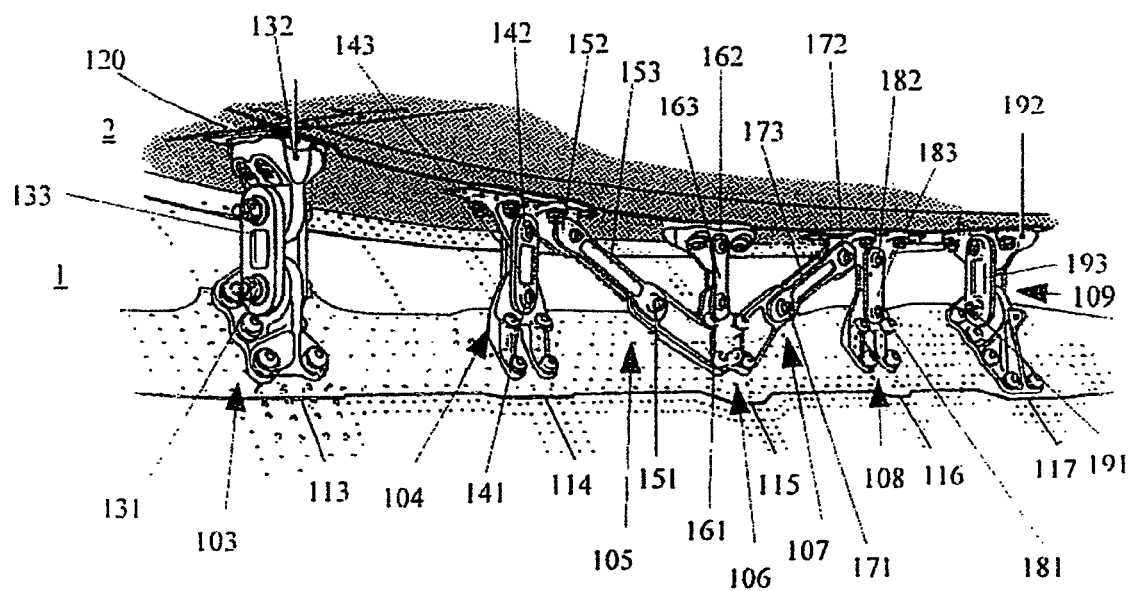

Below, an exemplary embodiment of the invention is explained with reference to the drawing. The following are shown:

FIG. 1 a perspective view of a wing-fuselage connection of an aircraft, according to an exemplary embodiment of the invention;

FIGS. 2 to 4 cross-sectional views of the wing-fuselage connection shown in FIG. 1 in relation to various load cases; and FIG. 5 a perspective view of a wing-fuselage connection according to the state of the art, as has been used in the transport aircraft TRANSALL.

First, with reference to FIG. 5, a known wing-fuselage connection of an aircraft according to the state of the art is described, as used in the transport aircraft TRANSALL. At the top of a fuselage 1 a wing 2 is coupled by means of a number of wing couplings 103, 104, 105, 106, 107, 108, 109. Each of the wing couplings is designed in the form of a rocker pendulum support that comprises a fuselage-side bearing 131, 141, 151, 161, 171, 181, 191, a wing-side bearing 132, 142, 152, 162, 172, 182, 192 and a pendulum 133, 143, 153, 163, 173, 183, 193 arranged in between. Near the leading edge of the wing and the trailing edge of the wing, first wing couplings 103, 104 and 108, 109 are provided that serve to take up forces in the direction of the vertical axis Z of the aircraft. In each case their fuselage-side bearing 131, 141 or 181, 191 is affixed to a fuselage frame 113, 114 or 116, 117. Their wing-side bearing 132, 142 or 182, 192 is affixed to a wing rib 120 of the wing 2. Furthermore, a wing coupling 106, which is provided to take up forces in the direction of the vertical axis Z of the aircraft in relation to the longitudinal direction X of the aircraft, is arranged in the middle between the wing couplings 104 and 108. Said wing coupling 106 is affixed to a fuselage frame 115 by means of a fuselage-side bearing 161, and is affixed also to the wing rib 120 by means of a wing-side bearing 162. In order to transfer forces in the longitudinal direction X of the aircraft, in the known wing-fuselage connection two further wing couplings 105, 107 are provided which with their fuselage-side bearing 151 or 171 together with the fuselage-side bearing 161 of the Z-wing coupling 106 are affixed to the fuselage frame 115 and with their wing-side bearing 152 or 172 together with the wing-side bearings 142 or 182 of the Z-wing couplings 104 or 108 are affixed to the wing rib 120. The wing couplings 103 and 109 that are provided for the transfer of the forces in the Z-direction are articulated in the Y-Z plane, while the other wing couplings 104, 106 and 108, provided for the transfer of forces in the Z-direction, and the wing couplings 105 and 107, provided for the transfer of the forces in the X-direction, are articulated in the X-Z plane. The wing couplings 105 and 107 that are provided for the transfer of the forces in the X-direction extend in the X-Z axis at an inclination to the Z-direction, namely so that their extensions intersect at a point in the fuselage frame 115.

FIG. 1 shows a wing-fuselage connection of an aircraft according to an exemplary embodiment of the invention, in which a wing 2, arranged at the top of a fuselage 1, is connected to a fuselage 1 by means of a number of couplings 3, 4, 5, 6 and by means of further couplings 7, 8. Only the wing couplings 3, 4, 5, 6, 7, 8 provided on the port side of the aircraft are shown; the direction of flight is indicated by an arrow D1. The wing couplings 3, 4, 5, 6 are provided for taking up forces essentially in the direction of the vertical axis Z of the aircraft and in the longitudinal direction X of the aircraft, while the further couplings 7, 8 are provided for taking up forces essentially in the direction Y of the wingspan.

The wing couplings 3, 4, 5, 6 which are essentially arranged in a row extending in the direction of the longitudinal direction X of the aircraft comprise two first wing couplings 3, 6 that are provided for taking up forces essentially in the direction of the vertical axis Z of the aircraft, and two second wing couplings 4, 5 which if the full number of wing couplings are intact are provided for taking up forces essentially in the longitudinal direction X of the aircraft.

The wing couplings 3, 4, 5, 6 are provided in the form of rocker pendulum supports or lever connections, each comprising two rotary joints, which in each case are formed by a fuselage-side bearing 31, 41, 51, 61, a bearing 32, 42, 52, 62 on the wing side 5, and a pendulum 33, 43, 53, 63 that is arranged in between. In each case the fuselage-side bearings 31 and 61 of the first wing couplings 3, 6 are affixed to a fuselage frame 11 or 18, while each of the fuselage-side bearings 41, 51 of the second wing couplings 4, 5 is affixed to two fuselage frames, namely the fuselage-side bearing 41 of the wing coupling 4 to the fuselage frames 12 and 13, and the fuselage-side bearing 51 of the wing coupling 5 to the fuselage frames 16 and 17. The term "affixed" in the context of wing couplings on the respective fuselage frames denotes that the respective fuselage-side bearings are connected, by way of a corresponding fuselage coupling part RA, either directly to the one or to the two fuselage frames 20, or by way of at least one further coupling part are connected to the one fuselage frame or to the two fuselage frames.

As shown in FIGS. 2 to 4, the wing-side bearings 32, 42, 52, 62 of the wing couplings 3, 4, 5, 6 are affixed to a wing rib 20 which essentially extends in longitudinal direction X of the aircraft. In other words, by way of a corresponding wing coupling part FA, the two wing-side bearings 42, 52 are connected either directly to one and the same rib 20 or by way of at least one further coupling part to the rib 20 or to the nearest rib 20 in the Y direction. As shown in FIG. 1, the rocker pendulum supports that form the first wing couplings 3, 6 are essentially articulated in the Y-Z-plane, while the rocker pendulum supports that form the second wing couplings 4, 5 are essentially articulated in the X-Z-plane.

In each case, the wing couplings 3, 4, 5, 6 by means of rocker pendulum supports are a combination of the following: a lever or lever part or pendulum 33, 43, 53, 63 which on two positions spaced apart from each other in longitudinal direction, preferably at its ends, comprises pivoting bearings; a wing coupling part with a wing-side bearing 32, 43, 53, 63; and a fuselage coupling part with a fuselage-side bearing 31, 41, 51, 61. The second wing couplings 4, 5, situated between the first wing couplings 3, 6 when viewed in longitudinal direction X of the aircraft, are designed so that the longitudinal extension of the levers 43, 53 of the second wing couplings 4, 5 form an acute angle relative to the longitudinal axis X of the aircraft, or relative to the connecting line of the fuselage-side bearings 41, 51 of the second wing couplings. In this arrangement the longitudinal extension of the levers 43, 53 is defined so that the longitudinal direction of the levers extends through the centre of the wing-side bearing and the centre of the fuselage-side bearing of the respective lever.

In this arrangement the longitudinal extension of the lever of the front second wing coupling 4 (i.e. situated closer to the aircraft front, i.e. in negative longitudinal direction of the aircraft), when said longitudinal extension starts from the fuselage-side bearing 41, preferably forms an angle W1 of between 10 degrees and 30 degrees with the positive longitudinal direction X of the aircraft, or with the rearwards pointing connecting line of the centres of the fuselage-side bearings 41, 51 of the second wing couplings 4, 5. In other words the direction of the longitudinal extension of the lever of the front second wing coupling 4 results, starting from the positive longitudinal direction X of the aircraft or the rearwards-directed connecting line of the centres of the fuselage-side bearings 41, 51 of the second wing couplings 4, 5, by a rotation of between −10 degrees and −30 degrees on the positive Y-axis.

As an alternative or in addition, the longitudinal direction of the lever of the rear second wing coupling 5, when said longitudinal extension starts from the fuselage-side bearing 51, forms an angle W2 of between 15 degrees and 40 degrees with the negative longitudinal direction X of the aircraft, or with the forwards pointing connecting line of the centres of the fuselage-side bearings 41, 51 of the second wing couplings 4, 5. In other words the direction of the longitudinal extension of the lever of the rear second wing coupling 4 results, starting from the negative longitudinal direction X of the aircraft or the forwards-directed connecting line of the centres of the fuselage-side bearings 41, 51 of the second wing couplings 4, 5, by a rotation of between +15 degrees and +40 degrees on the positive Y-axis.

These angles are defined for the lateral direction, i.e. they apply to the direction of view in the positive Y-direction, corresponding, for example, to the view of FIG. 4.

Preferably, in total two rows, in each case of two first wing couplings 3, 6 and two second wing couplings 4, 5, situated in between the former, are provided. These two rows are in particular situated relative to each other so as to be symmetrical to the longitudinal axis X of the aircraft. It is also possible for several such rows of wing couplings to be provided laterally of each longitudinal axis X of the aircraft. Preferably, the centres of the fuselage-side bearings 41, 51 and of the wing-side bearings 42, 52 are situated within an imaginary band with a width of 1.0 m, which band extends in the longitudinal direction X of the aircraft.

In particular applications it may be advantageous if the centres of the wing-side bearings 42, 52 of the second wing couplings 4, 5 have a minimum distance of 0.2 m when viewed in the longitudinal axis X of the aircraft.

As shown in FIG. 1 and in FIGS. 2 to 4, the second wing couplings 4, 5 or their levers 43, 53, which essentially extend in a direction situated in the X-Z plane, extend at an inclination to the Z-direction between the fuselage 1 and the wing 2, wherein they extend at an inclination to each other in such a way that the lines of application of the load or the longitudinal directions of the levers intersect above said load in the region of the wing 2, and in particular within the boundary of the associated wing rib 20. In this context the term "associated" wing rib 20 refers to that rib to which at least the wing-coupling parts FA are directly or indirectly affixed or attached, or to which the wing coupling parts FA are connected. As stated above, the term "associated" wing rib 20 can also refer to the nearest rib.

The angle of inclination of the second wing couplings 4, 5 is dimensioned such that in the case of a defect of one of the first wing couplings 3, 6 the second wing couplings 4, 5 take over the loads of the former, in other words apart from taking up the forces acting in the longitudinal direction X of the aircraft they, to a significant extent, also take up forces in the direction of the vertical axis Z of the aircraft, without their maximum load carrying capacity being exceeded.

In each case the wing couplings 4, 5 have a maximum load carrying capacity which in the exemplary embodiment presently described is designed in accordance with the maximum flight loads and landing loads as well as with a nominal crash load, for example negative acceleration of 9 g in forwards direction.

The load carrying capacity of the individual wing couplings 3, 4, 5, 6 and their direction of force take-up are matched so that in the case of a defect of one of the couplings 3, 4, 5, 6 the maximum load carrying capacity of the then remaining couplings is adequate for safe normal flight operation. In other words, as far as their angular positions are concerned, the wing couplings match each other such that the loads acting on the still intact couplings in the fail-safe case are approximately the same as they are in the crash case acting on all the couplings. Failure of one of the couplings 3, 4, 5, 6 might, for example, be caused by material fatigue or by an engine fault or, in particular in the case of aircraft in military applications, by enemy fire. The loads which are then to be taken up by the wing couplings 3, 4, 5, 6 in a damage-tolerant case or fail-safe case are thus approximately the same as the loads that would be experienced in the above-mentioned nominal crash case. It is unlikely for both cases, i.e. failure of one of the wing couplings 3, 4, 5, 6 and a crash case, to occur concurrently.

In addition, in order to take up forces in the direction Y of the wingspan, further wing couplings 7, 8 between the fuselage 1 and the wing 2 are provided, which wing couplings 7, 8 in the exemplary embodiment shown are also formed by rocker pendulum supports which in each case comprise a fuselage-side bearing 71, 81, a wing-side bearing 72, 82, and a pendulum 73, 83 arranged in between. The rocker pendulum supports of the further wing couplings 7, 8 are essentially articulated in the Y-Z-plane.

Now, with reference to FIGS. 2 to 4, the load of the wing couplings 3, 4, 5, 6 that take up the Z-loads and the X-loads will be considered for various particular load cases. In this process a positive sweep of the wing is assumed, in which sweep the centre of gravity of the lift forces acting on the wing 2 is situated in longitudinal direction X of the aircraft behind the middle of the arrangement formed by the wing couplings 3, 4, 5, 6. In this way the moment My as shown in the diagrams arises.

FIG. 2 shows the case where the wing coupling 6 that is arranged near the trailing edge of the wing has failed. The loads normally carried by said wing coupling 6 are distributed to the remaining wing couplings 3, 4, 5 in the manner shown; consequently the X-wing couplings 4, 5 are subjected more strongly to tensile loads, while the Z-wing coupling 3, which is situated near the leading edge of the wing, is subjected to compression loads. In this way the pitching moment My shown in the wing is taken up, which pitching moment My results from the assumed positive sweep of the wing. The tensile forces on the X-couplings 4, 5 of 1927 kN or 2088 kN and the compression force of 936 kN on the Z-wing coupling 3 only insignificantly exceed the loads taken into account for a nominal crash case, which case will be explained later with reference to FIG. 4.

FIG. 3 shows the case where the Z-wing coupling 3 that is arranged near the leading edge of the wing has failed. The forces experienced are taken up by the remaining wing couplings 4, 5, 6, wherein now the two X-couplings 4, 5 are subjected to compression loads, while the Z-connection 6, which is situated near the trailing edge of the wing, is subjected to tensile loads. In this case, too, the forces experienced on the respective connections do not exceed the forces for which the wing couplings 3, 4, 5, 6 are designed with a view to a nominal crash case. Compression forces of 809 kN or 1085 kN act on the X-wing couplings 4, 5, while tension forces of 1343 kN act on the Z-wing coupling 6 near the trailing edge of the wing. Again, the pitching moment My indicated in the wing is taken up due to the swept shape of the wing.

FIG. 4 shows the load on the wing couplings 3, 4, 5, 6 as they result from an assumed nominal crash case with negative acceleration of 9 g in forwards direction or 6 g in downwards direction. On the wing couplings 3, 4, 5, 6, which in this context are assumed to be intact, compression forces of 1,115 kN or 1,118 kN act on the Z-wing couplings 3 and 6 near the leading edge of the wing or the trailing edge of the wing, while tensile forces of 1,750 kN or 1,995 kN act on the X-couplings 4, 5.

As mentioned earlier, it is unlikely for a failure of one of the wing couplings 3, 4, 5, 6 and for a crash to happen concurrently. In this document the forces occurring on the additional wing couplings 7, 8 that are essentially applied in the direction Y of the wingspan have essentially not been taken into account.

The arrangements, provided on both sides of the fuselage 1, of the wing couplings 3, 4, 5, 6, which act in the V-direction and in the X-direction, of which wing couplings 3, 4, 5, 6 FIG. 1 only shows those on the port side, act together because they are coupled above the wing 2 so that, in particular, forces that occur on the wing 2 are taken up by the totality of all the wing couplings on both fuselage sides.

LIST OF REFERENCE CHARACTERS

1 Fuselage
2 Wing
3, 4, 5, 6 Wing coupling
31, 41, 51, 61 Fuselage-side bearing
32, 42, 52, 62 Wing-side bearing
33, 43, 53, 63 Pendulum
7, 8 Wing coupling
11, 12, 13, 14, 15, 16, 17, 18 Fuselage frame
20 Wing rib
71, 81 Fuselage-side bearing
73, 83 Wing-side bearing
103, 104, 105, 106, 107, 108, 109 Wing coupling
131, 141, 151, 161, 171, 181, 191 Fuselage-side bearing
25 132, 142, 152, 162, 172, 182, 192 Wing-side bearing
133, 143, 153, 163, 173, 183, 193 Pendulum
113, 114, 115, 30 116, 117 Fuselage frame
120 Wing rib

The invention claimed is:

1. A wing-fuselage connection of an aircraft, in which a wing that is arranged in an upper region of the fuselage is connected to the fuselage, the wing-fuselage connection comprising:
a plurality of connections arranged as at least one row of wing connections that includes at least two first wing connections and at least two second wing connections;
the at least two first wing connections and the at least two second wing connections are arranged in a row extending in an X-direction that is a longitudinal axis of the aircraft and respective first wing connections and respective second wing connections are structured and arranged for taking up forces in various directions,
wherein a load carrying capacity for each of the plurality of connections and their respective force take-up directions are adapted to one another in such a way that, in case one of the plurality of connections becomes defective, a maximum load carrying capacity of the remaining plurality of connections suffices for safe normal flight operations, and
wherein each of the at least two second wing connections comprises a rocker pendulum support having a fuselage-side bearing on a fuselage side, a wing-side bearing on a wing side, and a pendulum supported on the fuselage-side bearing and the wing-side bearing in an articulated fashion, such that at least one of:
lines of applied loads transmitted by the pendulums intersect in the region of the wing, or
a section of lines of applied loads transmitted by the pendulums that extend toward the wing form an acute angle with one of a section of the longitudinal axis of the aircraft that lies between the pendulums or a section of a connecting line of the bearings of the second wing connections on the fuselage side that lies between the pendulums; and
wherein each of the fuselage-side bearings of the second wing connections is directly affixed to two fuselage frames.

2. The wing-fuselage connection according to claim 1, wherein the first wing connections are structured and arranged for taking up forces essentially in a Z-direction parallel to a vertical axis of the aircraft, and the second wing connections, which in the case of a complete number of intact wing connections are provided for taking up forces essentially in the longitudinal direction of the aircraft.

3. The wing-fuselage connection according to claim 2, wherein the load carrying capacity of the first wing connections and their direction of force take-up are structured and arranged such that, in the case of a failure of one of the second wing connections, the first wing connections together with the second wing connections that remain intact take up the loads occurring in the wing-fuselage connection, without the maximum load carrying capacity of the wing couplings being exceeded in normal flight operation.

4. The wing-fuselage connection according to claim 2, wherein the first wing connections are arranged near a front wing spar or a rear wing spar, relative to the fuselage, and the second wing connections are provided in between.

5. The wing-fuselage connection according to claim 2, wherein the first wing connections extend essentially parallel to a Z-direction parallel to a vertical axis of the aircraft and are arranged between the fuselage and the wing, while the second wing connections extend essentially in a direction situated in an X-Z-plane, at an inclination to the Z-direction, between the fuselage and the wing, wherein the angles of inclination of the second wing connections are dimensioned and matched to each other so that the second wing connections in the case of a defect of one of the first wing connections take over their loads without their maximum load carrying capacity being exceeded.

6. The wing-fuselage connection according to claim 5, wherein the second wing connections extend at an inclination to each other and above the same in the region of the wing are taken together on a shared fitting.

7. The wing-fuselage connection according to claim 1, wherein the first wing connections are formed by rocker pendulum supports that essentially are articulated in a Y-Z-plane, while the rocker pendulum supports of the second wing connections are articulated in an X-Z-plane.

8. The wing-fuselage connection according to claim 1, wherein the wing connections that are provided for taking up forces essentially in a direction of a vertical axis of the aircraft and in the longitudinal direction of the aircraft are arranged on each side of the fuselage essentially in a row in the longitudinal direction of the aircraft.

9. The wing-fuselage connection according to claim 1, further comprising further connections provided between the fuselage and the wing in order to take up forces essentially in a direction Y of a wingspan.

10. The wing-fuselage connection according to claim 9, wherein the further wing connections comprise rocker pendulum supports that in each case are formed by a fuselage-side bearing, a wing-side bearing and a pendulum arranged in between.

11. The wing-fuselage connection according to claim 10, wherein the rocker pendulum supports of the further wing connection are essentially articulated in a Y-Z-plane.

12. The wing-fuselage connection according to claim 1, wherein the wing-fuselage connection is provided in a high-wing aircraft with a sweptback wing.

13. The wing-fuselage connection according to claim 1, wherein the section of the line of applied force for a front wing connection of the at least two second wing connections which extends toward the wing and the one of the section of the longitudinal axis of the aircraft which lies between the pendulums or the section of the connecting line of the bearings of the second wing connections on the fuselage side which lies between the pendulums form an angle between 10 degrees and 30 degrees.

14. The wing-fuselage connection according to claim 1, wherein the second wing connections are arranged to lie between the first wing connections.

15. The wing-fuselage connection according to claim 1, wherein the at least one row of wing connections comprises two rows of wing connections and arranged symmetric to one another relative to a direction toward a front of the aircraft.

16. The wing-fuselage connection according to claim 1, wherein the at least one row of wing connections comprises more than two rows of wing connections.

17. A wing-fuselage connection of an aircraft, in which a wing that is arranged in an upper region of the fuselage is connected to the fuselage, the wing-fuselage connection comprising:
a plurality of connections arranged as at least one row of wing connections that includes at least two first wing connections and at least two second wing connections;
the at least two first wing connections and the at least two second wing connections are arranged in a row extending in an X-direction that is a longitudinal axis of the aircraft and respective first wing connections and respective second wing connections are structured and arranged for taking up forces in various directions; and
each of the at least two second wing connections comprise a rocker pendulum support having a fuselage-side bearing on a fuselage side, a wing-side bearing on a wing side, and a pendulum supported on the fuselage-side bearing and the wing-side bearing in an articulated fashion,
wherein each of the fuselage-side bearings is directly affixed to two fuselage frames and the pendulums, from the fuselage-side bearing to the wing-side bearing, are oriented to converge toward each other,
whereby a load carrying capacity for each of the plurality of connections and their respective force take-up directions are adapted to one another in such a way that, in case one of the plurality of connections becomes defective, a maximum load carrying capacity of the remaining plurality of connections suffices for safe normal flight operations.

18. A wing-fuselage connection of an aircraft, in which a wing that is arranged in an upper region of the fuselage is connected to the fuselage, the wing-fuselage connection comprising:
a plurality of connections arranged as at least one row of wing connections that includes at least two first wing connections and at least two second wing connections;
the at least two first wing connections and the at least two second wing connections are arranged in a row extending in an X-direction that is a longitudinal axis of the aircraft and respective first wing connections and respective second wing connections are structured and arranged for taking up forces in various directions; and
each of the at least two second wing connections comprise a rocker pendulum support having a fuselage-side bearing on a fuselage side, a wing-side bearing on a wing side, and a pendulum supported on the fuselage-side bearing and the wing-side bearing in an articulated fashion,
wherein each of the fuselage-side bearings is directly affixed to two fuselage frames and, with regard to the X-direction, the at least two wing-side bearings are located between the at least two fuselage-side bearings, whereby imaginary lines extending from the pendulums converge in the wing,
whereby a load carrying capacity for each of the plurality of connections and their respective force take-up directions are adapted to one another in such a way that, in case one of the plurality of connections becomes defective, a maximum load carrying capacity of the remaining plurality of connections suffices for safe normal flight operations.

* * * * *